(12) United States Patent
Tang et al.

(10) Patent No.: US 11,550,134 B2
(45) Date of Patent: *Jan. 10, 2023

(54) COMPOSITE MICROSCOPE EMPLOYING TWO-PHOTON EXCITATION AND STIMULATED EMISSION DEPLETION TECHNIQUES

(71) Applicants: SUZHOU INSTITUTE OF BIOMEDICAL ENGINEERING AND TECHNOLOGY, CHINESE ACADEMY OF SCIENCES, Jiangsu (CN); SUZHOU GUOKE MEDICAL TECHNOLOGY DEVELOPMENT (GROUP) CO., LTD., Jiangsu (CN)

(72) Inventors: Yuguo Tang, Jiangsu (CN); Yunhai Zhang, Jiangsu (CN); Tongda Wei, Jiangsu (CN); Jian Chang, Jiangsu (CN); Haomin Yang, Jiangsu (CN); Lin Ji, Jiangsu (CN)

(73) Assignees: Suzhou Institute of Biomedical Engineering and Technology, Chinese Academy of Sciences, Jiangsu (CN); Suzhou Guoke Medical Technology Development (Group) Co., Ltd., Jiangsu (CN)

( * ) Notice: Subject to any disclaimer, the term of this patent is extended or adjusted under 35 U.S.C. 154(b) by 247 days.

This patent is subject to a terminal disclaimer.

(21) Appl. No.: 16/977,630

(22) PCT Filed: Nov. 27, 2018

(86) PCT No.: PCT/CN2018/117612
§ 371 (c)(1),
(2) Date: Sep. 2, 2020

(87) PCT Pub. No.: WO2020/048021
PCT Pub. Date: Mar. 12, 2020

(65) Prior Publication Data
US 2021/0048658 A1 Feb. 18, 2021

(30) Foreign Application Priority Data
Sep. 7, 2018 (CN) .......................... 201811040615.1

(51) Int. Cl.
*G02B 21/06* (2006.01)
*G02B 21/00* (2006.01)

(52) U.S. Cl.
CPC ......... *G02B 21/06* (2013.01); *G02B 21/0032* (2013.01); *G02B 21/0036* (2013.01)

(58) Field of Classification Search
CPC .......................... G02B 21/06; G02B 21/0032; G02B 21/0036; G02B 2207/114; G02B 21/0076; G02B 21/08; G02B 21/082
(Continued)

(56) References Cited

U.S. PATENT DOCUMENTS 6,020,591 A * 2/2000 Harter ................ G02B 21/0084
250/459.1
2010/0176307 A1 7/2010 Hell et al.
(Continued)

FOREIGN PATENT DOCUMENTS

CN 101821607 A 9/2010
CN 102661938 A 9/2012
(Continued)

OTHER PUBLICATIONS

International Search Report of the International Search Authority issued in PCT/CN2018/117612.
(Continued)

*Primary Examiner* — Stephone B Allen
*Assistant Examiner* — Rahman Abdur
(74) *Attorney, Agent, or Firm* — Imore Patent Law Group, P.C.; Carolyn S. Elmore; Joseph C. Zucchero

(57) ABSTRACT

A two-photon stimulated emission depletion composite microscope, comprising a two-photon imaging unit (100) and an STED imaging unit (200), wherein the two-photon imaging unit (100) can be used for a relatively thick sample, and the STED super-resolution imaging unit can be used for a region of interest on a surface of a sample, and the microscope makes light spots generated by an excitation light and a depletion light after being focused by an objective lens (OL) accurately coincide in a three-dimensional distribution. The two-photon stimulated emission depletion composite microscope (10) integrates two functions of STED imaging and two-photon imaging and makes the two (Continued)

types of light spots generated by an excitation light and a depletion light after being focused by an objective lens accurately coincide in a three-dimensional distribution, thereby providing a powerful tool for cutting-edge biomedical research.

12 Claims, 2 Drawing Sheets

(58) Field of Classification Search
USPC .......................................................... 359/385
See application file for complete search history.

(56) References Cited

U.S. PATENT DOCUMENTS

| | | | |
|---|---|---|---|
| 2011/0109958 | A1 | 5/2011 | Yokoi |
| 2018/0246308 | A1* | 8/2018 | Shi ..................... G02B 21/0072 |
| 2018/0267284 | A1* | 9/2018 | Ben-Yakar ......... G02B 21/0084 |
| 2019/0380585 | A1* | 12/2019 | Chen .................. G02B 21/0048 |

FOREIGN PATENT DOCUMENTS

| | | | | |
|---|---|---|---|---|
| CN | 103308496 | A | 9/2013 | |
| CN | 103616330 | A | 3/2014 | |
| CN | 103676123 | * | 3/2014 | ............. G02B 21/06 |
| CN | 103676123 | A | 3/2014 | |
| CN | 103698309 | A | 4/2014 | |
| CN | 104062750 | A | 9/2014 | |
| CN | 104296685 | A | 1/2015 | |

OTHER PUBLICATIONS

Written Opinion of International Application No. PCT/CN2018/117612.
Notification of First Office Action in priority Chinese Application No. 201811040615.1.
Notification of Second Office Action in priority Chinese Application No. 201811040615.1.
Tongda, W., et al. "Super Resolution Imaging Technology of Stimulated Emission Depletion."
Yang, Y., et al., "Medical Biological Electron Microscope Technology," Second Military Medical University Press.

* cited by examiner

COMPOSITE MICROSCOPE EMPLOYING TWO-PHOTON EXCITATION AND STIMULATED EMISSION DEPLETION TECHNIQUES

CROSS-REFERENCE TO RELATED APPLICATIONS

This application is a US National Stage entry of International Application No. PCT/CN2018/117612, filed Nov. 27, 2018, published in Chinese. This application also claims priority to Chinese Patent Application No. 201811040615.1 filed with CNIPA on Sep. 7, 2018, the entirety of which is incorporated herein by reference.

TECHNICAL FIELD

The present invention relates to the technical field of microscopic optical imaging, and in particular relates to a two-photon stimulated emission depletion composite microscope.

BACKGROUND

The imaging resolution of optical super-resolution microscopy has exceeded the limit derived from optical diffraction, and the imaging resolution thereof is much higher than that of traditional optical microscopes, which has been a research hotspot in recent years and various types of optical super-resolution microscopes have emerged. The stimulated emission depletion (STED) microscopy is the first far-field optical microscopy that breaks through the optical diffraction limit directly, which is based on the laser confocal microscopy imaging. As compared to other types of super-resolution microscopy, the stimulated emission depletion microscopy has relatively fast imaging speed, and can be used in live cell imaging, and can detect finer structures in biomedical research.

The STED imaging has very high degree of resolution, but has shallow imaging depth. The two-photon microscopic imaging has poor degree of resolution but has deep imaging depth due to the use of a near-infrared light. However, there has been no technical report of a composite microscope integrating both functions of STED imaging and two-photon imaging, wherein, for thicker samples, the two-photon imaging can be used, and for regions of interest on the surface of samples, the STED super-resolution imaging can be used.

SUMMARY

In view of the defects in the prior art, it is needed to provide a two-photon stimulated emission depletion composite microscope that can achieve rapid and high-precision beam combination of excitation light spot and depletion light spot.

To achieve the above objective, the present invention adopts the following technical solutions:

A two-photon stimulated emission depletion composite microscope, comprising a two-photon imaging unit and an STED imaging unit, the two-photon imaging unit comprises a femtosecond laser emitter, a first reflector, a second reflector, a first dichroic mirror, a second optical filter, a beam expander composed of a first lens and a second lens, a seventh reflector, a second dichroic mirror, a λ/4 wafer, a sixth reflector, an XY scanning mirror, a scanning lens, a tube lens, a third dichroic mirror, an objective lens, a three-dimensional nano-positioning platform for placing a sample thereon, a third optical filter, an eighth reflector, a third lens, and a photomultiplier tube, wherein femtosecond laser emitted by the femtosecond laser emitter is reflected by the first reflector and the second reflector and enters the first dichroic mirror, the femtosecond laser transmitted through the first dichroic mirror enters the second optical filter and passes through the second optical filter to form an incident excitation light beam to enter the beam expander composed of the first lens and the second lens, and the light beam exiting from the second lens is reflected by the seventh reflector to enter the second dichroic mirror and is transmitted through the second dichroic mirror to enter the λ/4 wafer, and then the light beam is reflected by the sixth reflector to enter the XY scanning mirror, and the light beam exiting from the XY scanning mirror sequentially passes through the scanning lens and the tube lens to enter the third dichroic mirror, and the light beam transmitted through the third dichroic mirror enters the objective lens and is focused by the objective lens onto a sample placed on the three-dimensional nano-positioning platform; fluorescence emitted by the sample is collected by the objective lens and then enters the third dichroic mirror, and after being reflected by the third dichroic mirror, the fluorescence enters the third optical filter, and the third optical filter is configured to suppress an incident laser and transmit the fluorescence, and the fluorescence transmitted through the third optical filter is reflected by the eighth reflector and then enters the third lens, and the fluorescence is focused by the third lens to enter the photomultiplier tube which is configured to detect a two-photon imaging fluorescence signal; and the STED imaging unit comprises a supercontinuum laser emitter, an optical fiber head, a four-degree-of-freedom regulator, the first dichroic mirror, the second optical filter, the beam expander composed of the first lens and the second lens, the seventh reflector, the second dichroic mirror, a third reflector, a fourth reflector, a fifth reflector, a phase plate, the λ/4 wafer, the sixth reflector, the XY scanning mirror, the scanning lens, the tube lens, the third dichroic mirror, the objective lens, the three-dimensional nano-positioning platform for placing a sample thereon, the third optical filter, the eighth reflector, a fourth lens, a pinhole, and an avalanche photodiode; the eighth reflector is removable from an original optical path where it is initially located; the optical fiber head is clamped in a four-degree-of-freedom regulator, and the four-degree-of-freedom regulator is configured to adjust the optical fiber head to rotate with two degree-of-freedom around the X axis and the Y axis and translate with two degree-of-freedom along the X axis and the Y axis, so as to adjust a position and a transmission direction of the laser output by the optical fiber head, wherein pulsed laser emitted by the supercontinuum laser emitter is collimated and output by the optical fiber head, and one part of the laser output by the optical fiber head with a wavelength less than a first wavelength is reflected by the first dichroic mirror and is filtered by the second optical filter to form an excitation light, and the excitation light enters the beam expander composed of the first lens and the second lens, exits from the second lens and is reflected by the seventh reflector to enter the second dichroic mirror and is transmitted through the second dichroic mirror; and the other part of the laser output by the optical fiber head with a wavelength greater than the first wavelength is transmitted through the first dichroic mirror and is filtered by a first optical filter to form a depletion light, and the depletion light enters the phase plate after being sequentially reflected by the third reflector, the fourth reflector and the fifth reflector, and a light beam transmitted through the phase plate is reflected by the second dichroic mirror, and the excitation light and the depletion light are combined by the second dichroic mirror, and the combined beam enters the $\lambda/4$ wafer for polarization state adjustment, and is then reflected by the sixth reflector to enter the XY scanning mirror, and the light beam exiting from the XY scanning mirror sequentially passes through the scanning lens and the tube lens TL to enter the third dichroic mirror, and the light beam transmitted through the third dichroic mirror enters the objective lens and then is focused by the objective lens onto a sample placed on the three-dimensional nano-positioning platform, and fluorescence emitted by the sample is collected by the objective lens and then enters the third dichroic mirror, and after being reflected by the third dichroic mirror, the fluorescence enters the third optical filter, and the third optical filter is configured to suppress an incident laser and transmit the fluorescence, and with the eighth reflector removed from the original optical path where the eighth reflector is initially located, the fluorescence transmitted through the third optical filter directly enters the fourth lens and is focused to the pinhole located at a focus of the fourth lens, and the light beam exiting from the pinhole enters the avalanche photodiode which is configured to detect an STED imaging fluorescence signal.

In some preferred embodiments, the first reflector, the second reflector, the third reflector, the fourth reflector, the fifth reflector, the sixth reflector, the seventh reflector and the eighth reflector are angle-adjustable around an X axis and a Y axis.

In some preferred embodiments, a light beam emitted by the femtosecond laser emitter can be quickly directed into the composite microscope by adjusting the angles of the first reflector and the second reflector around the X axis and the Y axis.

In some preferred embodiments, the position of the second lens is adjustable along an optical axis Z.

In some preferred embodiments, a position of an excitation light spot in an X direction or a Y direction can be adjusted by adjusting the angle of the seventh reflector around the X axis or the Y axis, and a position of the excitation light spot in a direction of the optical axis Z can be adjusted by adjusting the position of the second lens along the optical axis Z, such that the excitation light spot and a depletion light spot accurately coincide.

In some preferred embodiments, the first wavelength is 532 nm.

In some preferred embodiments, the center wavelength of the second optical filter is 488 nm, and the center wavelength of the first optical filter is 592 nm.

In some preferred embodiments, a phase distribution of the phase plate has a spiral distribution of 0-$2\pi$.

In some preferred embodiments, during the detection of a two-photon imaging fluorescence signal, the XY scanning mirror moves and scans the light beam, and the three-dimensional nano-positioning platform remains stationary.

In some preferred embodiments, during the detection of an STED imaging fluorescence signal, the XY scanning mirror stays at a zero position when performing scanning, and the three-dimensional nano-positioning platform is moved such that the sample is moved and scanned for imaging.

In some preferred embodiments, the femtosecond laser emitter and the supercontinuum laser emitter are detachably mounted on the two-photon stimulated emission depletion composite microscope.

The above technical solutions in the present invention have the following advantages:

The present invention provides a two-photon stimulated emission depletion composite microscope, comprising a two-photon imaging unit and an STED imaging unit, wherein the two-photon imaging unit can be used for a relatively thick sample, and the STED super-resolution imaging unit can be used for a region of interest on a surface of a sample, and the microscope makes light spots generated by an excitation light and a depletion light after being focused by an objective lens accurately coincide in a three-dimensional distribution. The two-photon stimulated emission depletion composite microscope provided by the present invention integrates two functions of STED imaging and two-photon imaging, and makes the two types of light spots generated by an excitation light and a depletion light after being focused by an objective lens accurately coincide in a three-dimensional distribution, thereby providing a powerful tool for cutting-edge biomedical research.

DETAILED DESCRIPTION

In order to clearly illustrate the purpose, technical solutions, and advantages of the present application, the present application is described in further detail with reference to the appended drawings and embodiments. It should be understood that, the specific embodiments described herein are only used to illustrate the present application, not to limit the present application.

Figure 1:
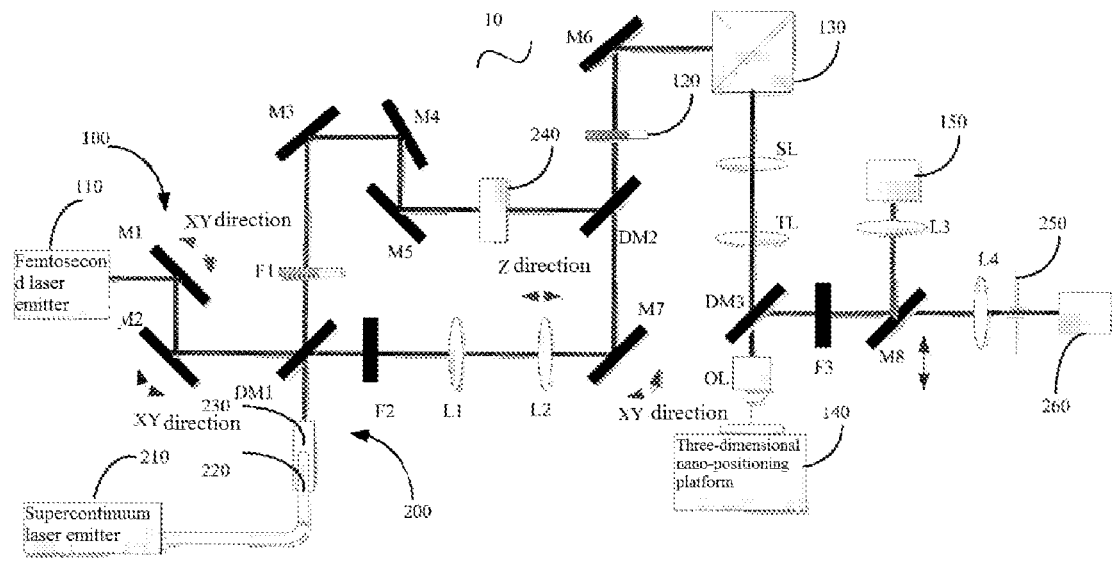
FIG. 1 is a schematic structural view of a two-photon stimulated emission depletion composite microscope provided by an embodiment of the present invention.

FIG. 1 is a schematic structural view of a two-photon stimulated emission depletion composite microscope 10 provided by an embodiment of the present invention, and the composite microscope 10 comprises a two-photon imaging unit 100 and an STED imaging unit 200.

The two-photon imaging unit 100 comprises a femtosecond laser emitter 110, a first reflector M1, a second reflector M2, a first dichroic mirror DM1, a second optical filter F2, a beam expander composed of a first lens L1 and a second lens L2, a seventh reflector M7, a second dichroic mirror DM2, a $\lambda/4$ wafer 120, a sixth reflector M6, an XY scanning mirror 130, a scanning lens SL, a tube lens TL, a third dichroic mirror DM3, an objective lens OL, a three-dimensional nano-positioning platform 140 for placing a sample thereon, a third optical filter F3, an eighth reflector M8, a third lens L3, and a photomultiplier tube (PMT) 150.

The two-photon imaging unit 100 provided in the embodiment of the present invention works in the following way:

The femtosecond laser emitted by the femtosecond laser emitter 110 is reflected by the first reflector M1 and the second reflector M2 and enters the first dichroic mirror DM1, the femtosecond laser transmitted through the first dichroic mirror DM1 enters the second optical filter F2, and passed through the second optical filter F2 to form an incident excitation light beam to enter the beam expander composed of the first lens L1 and the second lens L2, and the light beam exiting from the second lens L2 is reflected by the seventh reflector M7 to enter the second dichroic mirror DM2 and is transmitted through the second dichroic mirror DM2 to enter the $\lambda/4$ wafer, and then the light beam is reflected by the sixth reflector M6 to enter the XY scanning mirror, and the light beam exiting from the XY scanning mirror sequentially pass through the scanning lens SL and the tube lens TL to enter the third dichroic mirror DM3, and the light beam transmitted through the third dichroic mirror DM3 enters the objective lens OL and is focused by the objective lens OL onto a sample placed on the three-dimensional nano-positioning platform, and fluorescence emitted by the sample is collected by the objective lens OL and then enters the third dichroic mirror DM3, and after being reflected by the third dichroic mirror DM3, the fluorescence enters the third optical filter F3, and the third optical filter F3 is configured to suppress an incident laser and transmit fluorescence, and the fluorescence transmitted through the third optical filter F3 is reflected by the eighth reflector M8 and then enters the third lens L3, and the fluorescence is focused by the third lens L3 to enter the photomultiplier tube (PMT) which is configured to detect a two-photon imaging fluorescence signal.

It can be understood that, during detection of a two-photon imaging fluorescence signal, the XY scanning mirror moves and scans the light beam, and the three-dimensional nano-positioning platform remains stationary.

The STED imaging unit 200 comprises a supercontinuum laser emitter 210, an optical fiber head 220, a four-degree-of-freedom regulator 230, the first dichroic mirror DM1, the second optical filter F2, and the beam expander composed of the first lens L1 and the second lens L2, the seventh reflector M7, the second dichroic mirror DM2, a third reflector M3, a fourth reflector M4, a fifth reflector M5, a phase plate 240, the $\lambda/4$ wafer 120, the sixth reflector M6, the XY scanning mirror 130, the scanning lens SL, the tube lens TL, the third dichroic mirror DM3, the objective lens OL, the three-dimensional nano-positioning platform 140 for placing the sample thereon, the third optical filter F3, the eighth reflector M8, a fourth lens L4, a pinhole 250 and an avalanche photodiode 260; wherein the eighth reflector M8 is removable from an original optical path where it is initially located; wherein the optical fiber head 220 is clamped in the four-degree-of-freedom regulator 230, and the four-degree-of-freedom regulator 230 is configured to adjust the optical fiber head 220 to rotate with two degree-of-freedom around the X axis and the Y axis and translate with two degree-of-freedom along the X axis and the Y axis, so as to adjust a position and a transmission direction of the laser output by the optical fiber head.

The STED imaging unit 200 provided by the embodiment of the present invention works in the following way:

Pulsed laser emitted by the supercontinuum laser emitter 210 is collimated and output by the optical fiber head 220, and one part of the laser output by the optical fiber head 220 with a wave length less than a first wavelength is reflected by the first dichroic mirror DM1, and is filtered by the second optical filter F2 to form an excitation light, and the excitation light enters the beam expander composed of the first lens L1 and the second lens L2, exits from the second lens L2 and is reflected by the seventh reflector M7 to enter the second dichroic mirror DM2 and is transmitted through the second dichroic mirror DM2.

The other part of the laser output by the optical fiber head 220 with a wavelength greater than the first wavelength is transmitted through the first dichroic mirror DM1 and is filtered by the first optical filter F1 to form a depletion light, and the depletion light enters the phase plate 240 after being sequentially reflected by the third reflector M3, the fourth reflector M4 and the fifth reflector M5, and a light beam transmitted through the phase plate 240 is reflected by the second dichroic mirror DM2, and the excitation light and the depletion light are combined by the second dichroic mirror DM2, and the combined beam enters the $\lambda/4$ wafer 120 for polarization state adjustment, and is then reflected by the sixth reflector M6 to enter the XY scanning mirror 130, and the light beam exiting from the XY scanning mirror 130 sequentially passes through the scanning lens SL and the tube lens TL to enter the third dichroic mirror DM3, and the light beam transmitted through the third dichroic mirror DM3 enters the objective lens OL and then is focused by the objective lens OL onto a sample placed on the three-dimensional nano-positioning platform 140, and fluorescence emitted by the sample is collected by the objective lens OL and then enters the third dichroic mirror DM3, and after being reflected by the third dichroic mirror DM3, the fluorescence enters the three filters F3, and the third optical filter F3 is configured to suppress an incident laser and transmit fluorescence, and with the eighth reflector M8 removed from the original optical path where the eighth reflector is initially located, the fluorescence transmitted through the third optical filter F3 directly enters the fourth lens and is focused to the pinhole located at a focus of the fourth lens L4, and the light beam exiting from the pinhole 250 enters the avalanche photodiode 260 which is configured to detect an STED imaging fluorescence signal.

It can be understood that, during the detection of an STED imaging fluorescence signal, the XY scanning mirror stays at a zero position when performing scanning, and the three-dimensional nano-positioning platform is moved such that the sample is moved and scanned for imaging.

In some preferred embodiments, the first reflector M1, the second reflector M2, the third reflector M3, the fourth reflector M4, the fifth reflector M5, the sixth reflector M6, the seventh reflector M7 and the eighth reflector M8 are angle-adjustable around an X axis and a Y axis so that the laser beam can be accurately input into the microscope system.

It should be understood that, for the femtosecond laser emitter emitting light beam to propagate in free space, two reflectors comprising the first reflector M1 and second reflector M2 with angles adjustable around the X axis and the Y axis are used, and the light beam emitted by the femtosecond laser emitter can be quickly directed into the microscope system by adjusting M1 and M2;

It should be understood that, for the supercontinuum laser emitter that outputs a collimated laser by using optical fiber, and an optical fiber head is provided at one end of the optical fiber, the optical fiber head is clamped in the four-degreeof-freedom regulator, and the four-degree-of-freedom regulator is configured to adjust the optical fiber head to rotate around the X axis and the Y axis and translate along the X axis and the Y axis, so that the laser emitted from the optical fiber head can be quickly and accurately coupled into the optical path.

In some preferred embodiments, the first wavelength is 532 nm, the center wavelength of the second optical filter F2 is 488 nm, and the center wavelength of the first optical filter F1 is 592 nm.

In some preferred embodiments, a phase distribution of the phase plate has a spiral distribution of 0-2π.

In some preferred embodiments, the femtosecond laser emitter 110 and the supercontinuum laser emitter 210 are detachably mounted on the two-photon stimulated emission depletion composite microscope.

It can be understood that, the femtosecond laser emitter and the supercontinuum laser emitter used in the two-photon stimulated emission depletion composite microscope provided by the present invention are relatively large in size, and these laser emitters need to be demounted from the microscope when the microscope is transported or moved. In order to enable the femtosecond laser emitter and the supercontinuum light laser emitter to be quickly and accurately connected to the microscope system, the femtosecond laser emitter and the continuous laser emitter are detachably mounted on the two-photon stimulated emission depletion composite for convenient disassembly and transportation.

Figure 2:
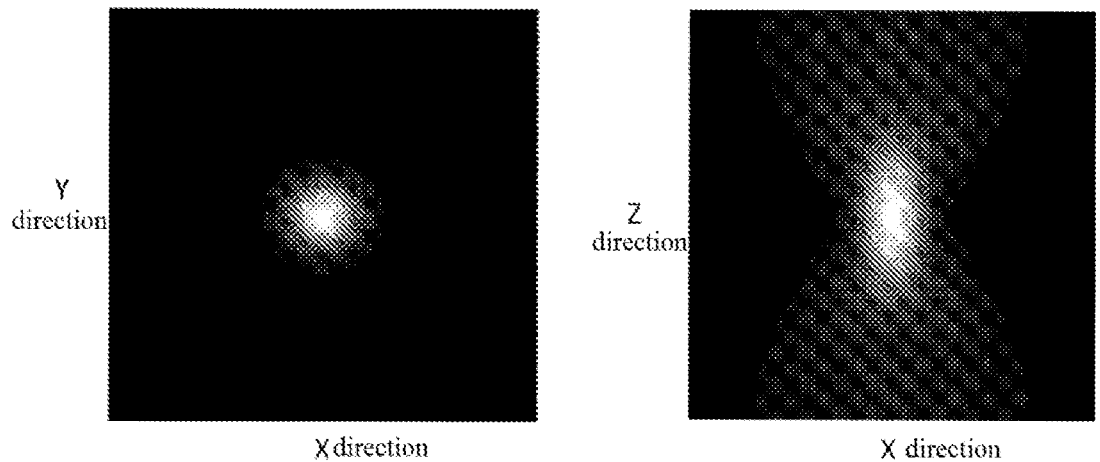
FIG. 2 shows a light intensity distribution of an excitation light spot at the focus of an objective lens of a two-photon stimulated emission depletion composite microscope provided by the present invention.

FIG. 2 shows the light intensity distribution of the excitation light spot at the focus of the objective lens (light intensity distribution in an X-Y plane and an X-Z plane) in the two-photon stimulated emission depletion composite microscope provided by the present invention, wherein, after passing through the objective lens, the excitation light is focused to be a solid three-dimensional light spot having a long oval shape.

Figure 3:
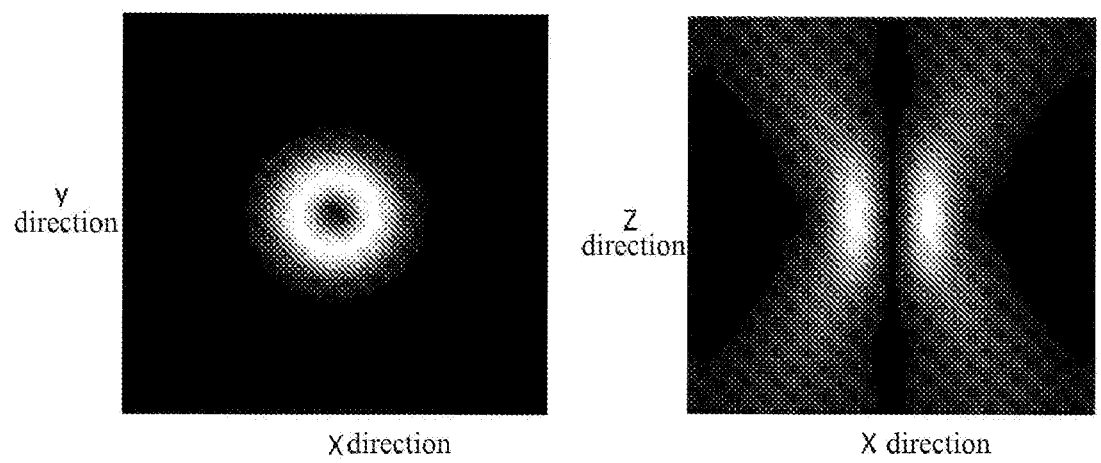
FIG. 3 shows a light intensity distribution of a depletion light spot at the focus point of an objective lens of a two-photon stimulated emission depletion composite microscope provided by the present invention.

FIG. 3 shows the light intensity distribution of the depletion light spot at the focus of the objective lens (light intensity distribution in an X-Y plane and an X-Z plane) in the two-photon stimulated emission depletion composite microscope provided by the present invention, wherein, after passing through the objective lens, the depletion light is focused to be a hollow three-dimensional light spot having a cylindrical shape.

It can be understood that, STED imaging requires the excitation light spot and the depletion light spot to coincide accurately in three-dimensional directions. The position of the depletion light spot is used as a reference (staying stationary), and the three-dimensional position of the excitation light spot is adjusted to accurately coincide with the excitation light spot, wherein the angle of the seventh reflector M7 around X axis or the Y axis is adjusted to change the position of the excitation light spot in the X or Y direction, and the position of the second lens L2 along the optical axis Z is adjusted to change the position of the excitation light spot in the Z direction, therefore, the excitation light spot and the loss light spot can be made to accurately coincide with each other.

The two-photon stimulated emission depletion composite microscope provided by the present invention comprises a two-photon imaging unit and an STED imaging unit, wherein the two-photon imaging unit can be used for a relatively thick sample, and the STED super-resolution imaging unit can be used for a region of interest on a surface of a sample, and the microscope makes light spots generated by an excitation light and a depletion light after being focused by an objective lens accurately coincide in a three-dimensional distribution. The two-photon stimulated emission depletion composite microscope provided by the present invention integrates two functions of STED imaging and two-photon imaging and makes the two types of light spots generated by an excitation light and a depletion light after being focused by an objective lens accurately coincide in a three-dimensional distribution, thereby providing a powerful tool for cutting-edge biomedical research.

Certainly, the two-photon stimulated emission depletion composite microscope of the present invention can also have various variations and modifications, which are not limited to the specific structures in the above embodiments. In summary, the protection scope of the present invention shall include those variations, substitutions and modifications that are obvious to a person skilled in the art.

Although the present invention has been described with reference to the currently preferred embodiments, a person skilled in the art should understand that the above preferred embodiments are only used to illustrate the present invention and is not intended to limit the protection scope of the present invention. Any modification, equivalent substitution or improvement made within the scope of the gist and principle of the invention fall within the protection scope of the present invention.

What is claimed is:

1. A two-photon stimulated emission depletion composite microscope, comprising a two-photon imaging unit and a stimulated emission depletion (STED) imaging unit, the two-photon imaging unit comprises a femtosecond laser emitter, a first reflector, a second reflector, a first dichroic mirror, a second optical filter, a beam expander composed of a first lens and a second lens, a seventh reflector, a second dichroic mirror, a λ/4 wafer, a sixth reflector, an XY scanning mirror, a scanning lens, a tube lens, a third dichroic mirror, an objective lens, a three-dimensional nano-positioning platform for placing a sample thereon, a third optical filter, an eighth reflector, a third lens, and a photomultiplier tube; wherein femtosecond laser emitted by the femtosecond laser emitter is reflected by the first reflector and the second reflector and enters the first dichroic mirror, the femtosecond laser transmitted through the first dichroic mirror enters the second optical filter and passes through the second optical filter to form an incident excitation light beam to enter the beam expander composed of the first lens and the second lens, and the light beam exiting from the second lens is reflected by the seventh reflector to enter the second dichroic mirror and is transmitted through the second dichroic mirror to enter the λ/4 wafer, and then the light beam is reflected by the sixth reflector to enter the XY scanning mirror, and the light beam exiting from the XY scanning mirror sequentially passes through the scanning lens and the tube lens to enter the third dichroic mirror, and the light beam transmitted through the third dichroic mirror enters the objective lens and is focused by the objective lens onto a sample placed on the three-dimensional nano-positioning platform; fluorescence emitted by the sample is collected by the objective lens and then enters the third dichroic mirror, and after being reflected by the third dichroic mirror, the fluorescence enters the third optical filter, and the third optical filter is configured to suppress an incident laser and transmit the fluorescence, and the fluorescence transmitted through the third optical filter is reflected by the eighth reflector and then enters the third lens, and the fluorescence is focused by the third lens to enter the photomultiplier tube which is configured to detect a two-photon imaging fluorescence signal; and the STED imaging unit comprises a supercontinuum laser emitter, an optical fiber head, the first dichroic mirror, the second optical filter, the beam expander composed of the first lens and the second lens, the seventh reflector, the second dichroic mirror, a third reflector, a fourth reflector, a fifth reflector, a phase plate, the λ/4 wafer, the sixth reflector, the XY scanning mirror, the scanning lens, the tube lens, the third dichroic mirror, the objective lens, the three-dimensional nano-positioning platform for placing a sample thereon, the third optical filter, the eighth reflector, a fourth lens, a pinhole, and an avalanche photodiode, the eighth reflector being removable from an original optical path where it is initially located, wherein pulsed laser emitted by the supercontinuum laser emitter is collimated and output by the optical fiber head, and one part of the laser output by the optical fiber head with a wavelength less than a first wavelength is reflected by the first dichroic mirror and is filtered by the second optical filter to form an excitation light, and the excitation light enters the beam expander composed of the first lens and the second lens, exits from the second lens and is reflected by the seventh reflector to enter the second dichroic mirror and is transmitted through the second dichroic mirror; and the other part of the laser output by the optical fiber head with a wavelength greater than the first wavelength is transmitted through the first dichroic mirror and is filtered by a first optical filter to form a depletion light, and the depletion light enters the phase plate after being sequentially reflected by the third reflector, the fourth reflector and the fifth reflector, and a light beam transmitted through the phase plate is reflected by the second dichroic mirror, and the excitation light and the depletion light are combined by the second dichroic mirror, and the combined beam enters the λ/4 wafer for polarization state adjustment, and is then reflected by the sixth reflector to enter the XY scanning mirror, and the light beam exiting from the XY scanning mirror sequentially passes through the scanning lens and the tube lens TL to enter the third dichroic mirror, and the light beam transmitted through the third dichroic mirror enters the objective lens and then is focused by the objective lens onto a sample placed on the three-dimensional nano-positioning platform, and fluorescence emitted by the sample is collected by the objective lens and then enters the third dichroic mirror, and after being reflected by the third dichroic mirror, the fluorescence enters the third optical filter, and the third optical filter is configured to suppress an incident laser and transmit the fluorescence, and with the eighth reflector removed from the original optical path where the eighth reflector is initially located, the fluorescence transmitted through the third optical filter directly enters the fourth lens and is focused to the pinhole located at a focus of the fourth lens, and the light beam exiting from the pinhole enters the avalanche photodiode which is configured to detect an STED imaging fluorescence signal.

2. The two-photon stimulated emission depletion composite microscope according to claim 1, wherein
the first reflector, the second reflector, the third reflector, the fourth reflector, the fifth reflector, the sixth reflector, the seventh reflector and the eighth reflector are angle-adjustable around an X axis and a Y axis.

3. The two-photon stimulated emission depletion composite microscope according to claim 2, wherein
a light beam emitted by the femtosecond laser emitter can be quickly directed into the composite microscope by adjusting the angles of the first reflector and the second reflector around the X axis and the Y axis.

4. The two-photon stimulated emission depletion composite microscope according to claim 2, wherein
the position of the second lens is adjustable along an optical axis Z.

5. The two-photon stimulated emission depletion composite microscope according to claim 4, wherein
a position of an excitation light spot in an X direction or a Y direction can be adjusted by adjusting the angle of the seventh reflector around the X axis or the Y axis, and a position of the excitation light spot in a direction of the optical axis Z can be adjusted by adjusting the position of the second lens along the optical axis Z, such that the excitation light spot and a depletion light spot accurately coincide.

6. The two-photon stimulated emission depletion composite microscope according to claim 1, wherein
the optical fiber head is clamped in a four-degree-of-freedom regulator, and the four-degree-of-freedom regulator is configured to adjust the optical fiber head to rotate with two degree-of-freedom around the X axis and the Y axis and translate with two degree-of-freedom along the X axis and the Y axis, so as to adjust a position and a transmission direction of the laser output by the optical fiber head.

7. The two-photon stimulated emission depletion composite microscope according to claim 1, wherein the first wavelength is 532 nm.

8. The two-photon stimulated emission depletion composite microscope according to claim 1, wherein the second optical filter has a center wavelength of 488 nm, and the first optical filter has a center wavelength of 592 nm.

9. The two-photon stimulated emission depletion composite microscope according to claim 1, wherein
a phase distribution of the phase plate has a spiral distribution of 0-2π.

10. The two-photon stimulated emission depletion composite microscope according to claim 1, wherein
during the detection of a two-photon imaging fluorescence signal, the XY scanning mirror moves and scans the light beam, and the three-dimensional nano-positioning platform remains stationary.

11. The two-photon stimulated emission depletion composite microscope according to claim 1, wherein
during the detection of STED imaging fluorescence signals, the XY scanning mirror stays at a zero position when performing scanning, and the three-dimensional nano-positioning platform is moved such that the sample is moved and scanned for imaging.

12. The two-photon stimulated emission depletion composite microscope according to claim 1, wherein
the femtosecond laser emitter and the supercontinuum laser emitter are detachably mounted on the two-photon stimulated emission depletion composite microscope.

* * * * *